United States Patent
Liu

(10) Patent No.: US 10,445,132 B2
(45) Date of Patent: Oct. 15, 2019

(54) METHOD AND APPARATUS FOR SWITCHING APPLICATIONS

(71) Applicant: SAMSUNG ELECTRONICS CO., LTD., Suwon-si (KR)

(72) Inventor: Gang Liu, Science (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 312 days.

(21) Appl. No.: 14/752,228

(22) Filed: Jun. 26, 2015

(65) Prior Publication Data

US 2016/0048412 A1    Feb. 18, 2016

(30) Foreign Application Priority Data

Aug. 12, 2014    (CN) .......................... 2014 1 0395876

(51) Int. Cl.
*G06F 9/48*    (2006.01)

(52) U.S. Cl.
CPC ........ *G06F 9/485* (2013.01); *G06F 2209/482* (2013.01)

(58) Field of Classification Search
CPC ...... G06F 9/485; G06F 9/4806; G06F 9/4843; G06F 9/4881; G06F 3/048
See application file for complete search history.

(56) References Cited

U.S. PATENT DOCUMENTS

| | | | | | |
|---|---|---|---|---|---|
| 2005/0268253 | A1* | 12/2005 | Johnson | ................ | G06F 3/0482 715/841 |
| 2006/0218502 | A1* | 9/2006 | Matthews | ............. | G06F 3/0482 715/779 |
| 2006/0277547 | A1* | 12/2006 | Abe | ...................... | G06F 9/4887 718/104 |
| 2007/0039005 | A1* | 2/2007 | Choi | ..................... | G06F 9/4843 718/107 |
| 2008/0052717 | A1* | 2/2008 | Lee | ....................... | G06F 3/0482 718/103 |

(Continued)

FOREIGN PATENT DOCUMENTS

| | | |
|---|---|---|
| CN | 101132586 A | 2/2008 |
| CN | 102945138 A | 2/2013 |

(Continued)

OTHER PUBLICATIONS

Heddings, "Stop Hitting Snooze: Change the Default Reminder Time for Outlook Appointments", published: Apr. 25, 2008, How-To Geek, https://www.howtogeek.com/howto/microsoft-office/stop-hitting-snooze-change-the-default-reminder-time-for-outlook-appointments/.*

(Continued)

*Primary Examiner* — Seth A Silverman
(74) *Attorney, Agent, or Firm* — Sughrue Mion, PLLC

(57) ABSTRACT

A method and an apparatus for switching applications are described. An embodiment of the method comprises the following steps: setting a first application as a resident application; displaying contemporaneously both a second application running in the foreground and an indication associated with the set resident application; and switching from the second application to the resident program so that the resident application runs in the foreground according to a preset condition for switching applications.

19 Claims, 12 Drawing Sheets

(56) References Cited

U.S. PATENT DOCUMENTS

| | | | | |
|---|---|---|---|---|
| 2008/0109886 A1* | 5/2008 | Matsumoto | ............ | G06F 21/554 726/5 |
| 2009/0171877 A1* | 7/2009 | Azami | ................. | G06F 3/1212 706/46 |
| 2009/0282407 A1* | 11/2009 | Hayashi | ................ | G06F 9/4881 718/100 |
| 2012/0324368 A1* | 12/2012 | Putz | ...................... | G06F 3/0486 715/748 |
| 2014/0047425 A1* | 2/2014 | Thapar | ...................... | G06F 8/65 717/168 |
| 2014/0113685 A1* | 4/2014 | Lee | ......................... | G06F 9/485 455/566 |
| 2014/0304612 A1* | 10/2014 | Collin | ................. | G06F 3/04842 715/748 |

FOREIGN PATENT DOCUMENTS

| | | |
|---|---|---|
| CN | 103530054 A | 1/2014 |
| CN | 103870093 A | 6/2014 |
| KR | 10-2012-0011137 A | 2/2012 |
| KR | 10-2013-0134017 A | 12/2013 |

OTHER PUBLICATIONS

Heddings, "Stop Hitting Snooze: Change the Default Reminder Time for Outlook Appointments", published: Apr. 25, 2008, How-To Geek, https://www.howtogeek.com/howto/microsoft-office/stop-hitting-snooze-change-the-default-reminder-time-for-outlook-appointments/ (Year: 2008).*

Communication dated Sep. 7, 2017, from the State Intellectual Property Office of People's Republic of China in counterpart Application No. 201510304345.0.

Communication dated May 14, 2018, from the State Intellectual Property Office of People's Republic of China in counterpart Application No. 201510304345.0.

Communication dated Nov. 8, 2018, issued by the State Intellectual Property Office of the People's Republic of China in counterpart Chinese Patent Application No. 201510304345.0.

Communication dated Jun. 14, 2019, issued by the State Intellectual Property Office of P.R. China in counterpart Chinese Application No. 201510304345.0.

* cited by examiner

METHOD AND APPARATUS FOR SWITCHING APPLICATIONS

RELATED APPLICATION

This application claims priority from Chinese Patent Application No. 201410395876.0, filed on Aug. 12, 2014, in the Chinese Intellectual Property Office, the disclosure of which is incorporated herein in its entirety by reference.

TECHNICAL FIELD

The present application generally relates to the field of computer technology, particularly, to the field of terminal device, and more particularly, to a method and an apparatus for switching applications.

BACKGROUND

With the development of terminal technologies, mobile intelligent terminals have been increasingly popular. Currently, only one application can run in a foreground in the intelligent terminals. When switching applications, a user has to exit the interface for running the current application firstly and return to a main interface of the terminal (also known as a main menu interface). Then the user looks for an icon for a target application on the main menu interface and clicks the icon to switch the application.

The above-mentioned method needs to switch the interfaces among the current application interface, the main interface and the target application interface, which makes the operations complicated. Especially, where an application is needed to run in the foreground for long time, if it is required to switch to another program temporarily and then return to the application, the whole switching process becomes very tedious.

SUMMARY

There is provided a method and an apparatus for switching applications.

According to an aspect of the present application, a method for switching applications in an apparatus is provided. The method may comprise: setting a first application as a resident application; displaying contemporaneously both a second application running in the foreground and an indication associated with the set resident application; switching from the second application to the resident application so that the resident application runs in the foreground according to a preset condition for switching applications.

According to an embodiment, the first application may be set as the resident application while the first application runs in the foreground of the apparatus.

According to an embodiment, the setting may further comprise: automatically setting the first application as the resident application, where a time length during which the first application continuously runs in the foreground is longer than or equals to a first threshold time length.

According to an embodiment, the setting may further comprises: displaying a resident program setting window for setting the first application as the resident application while the first application is running in the foreground; and setting the first application as the resident program, when a setting user input is received in the resident program setting window.

According to an embodiment, the displaying may further comprise: displaying the resident program setting window only when a time length during which the first application continuously runs in the foreground is longer than or equals to a preset setting duration threshold.

According to an embodiment, the switching may be performed in response to a switching user input received on the displayed indication.

According to an embodiment, the switching may be automatically performed when no operating instruction is received by the second program within a second threshold time length.

According to an embodiment, the switching may be automatically performed when a time length during which the resident program does not continuously run in the foreground is longer than or equals to a third threshold time length.

According to an embodiment, before the switching is performed, the method may further comprise: displaying prompt information indicating that the resident program will be switched to run in the foreground.

According to an embodiment, the prompt information comprises remaining time before the resident program is switched to run in the foreground.

According to an embodiment, the method may further comprises: providing a delay interface for extending the remaining time; adjusting the remaining time in response to a user input with respect to the delay interface.

According to an embodiment, a plurality of applications including the first application may be set as the resident programs, According to an embodiment, the method may further comprises: setting priorities of the plurality of resident programs, and the switching may further comprises: switching a resident program with the highest priority to run in the foreground.

According to another aspect of the present application, an apparatus for switching applications is provided. The apparatus may comprise: a controller configured to set a first application as a resident application; and a display configured to contemporaneously display both a second application running in foreground and an indication associated with the set resident application, wherein the controller is further configured to switch from the second application to the resident application so that the resident application runs in the foreground according to a preset condition for switching applications.

BRIEF DESCRIPTION OF THE DRAWING

Further features, objects and advantages of the present application will be more apparent after detailed descriptions of the non-limiting embodiments are discussed below with reference to the attached figures.

DETAILED DESCRIPTION

Figure 1:
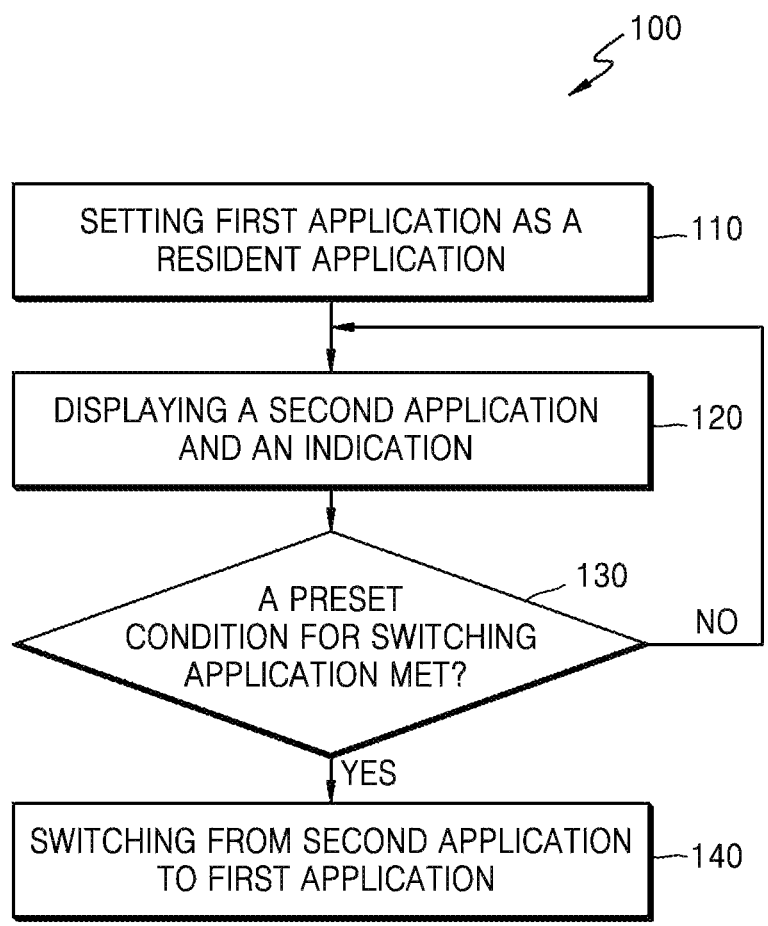
FIG. 1 is a flowchart illustrating a method for switching applications according to an embodiment of the present application.

Hereinafter, the present application will be further explained in detail with reference to the exemplary embodiments as shown in the accompanying drawings. It should be understood that the specific embodiments described herein are intended to explain rather than to limit the claimed solutions. In addition, only those portions directly related to the claimed solutions are shown in the drawings for ease of description.

Unless there is a conflict, the disclosed embodiments and features therein may be combined. Hereinafter, the claimed solutions will be explained in detail with reference to the accompanying drawings in connection with the embodiments.

Reference is made to FIG. 1, in which a method 100 for switching applications in a terminal device according to an embodiment of the present application is illustrated. The terminal device may be referred to simply as a terminal, a device, or an apparatus. The embodiment is mainly exemplified by applying the method to a terminal with a display screen which may include a smart phone, a tablet PC, an e-book reader, an MP3 (Moving Picture Experts Group Audio Layer III) player, an MP4 (Moving Picture Experts Group Audio Layer IV) player etc. The method for switching applications may comprise the following steps.

At step 110, at least one application, for example a first application, is set as a resident program. Throughout the specification, program and application are used interchangeably. For example, a resident program may be referred to as a resident application.

In the embodiment, the resident program refers to an application which is preferred or needed to run in the foreground of the terminal for long time. For example, while a user watches a video, a video playing program with the terminal may be set as the resident program; or while navigating a route by using the terminal in an automobile or during a walk, a navigation program may be set as the resident program. It is because the user likes to maintain such programs (e.g., a video playing program or a navigation program) in the foreground of the terminal relatively for a long time.

If a need occurs to use a different program temporarily in the midst of using such resident program, the user can efficiently return to such resident program after using the different program according to the present application. For setting the resident application, a single application may be set as the resident program, or a plurality of applications may be also set as the resident programs according to actual conditions.

At step 120, after at least one resident program is set at step 110, a different program, such as a second program different from the resident program, is displayed running in the foreground. The different program may just run in the foreground temporarily or for relatively a short time for a temporary operation since the resident program is needed to run again in the foreground for long time. At step 120, according to an embodiment, the second application may be displayed together along with an indication associated with the resident application. The indication may be used for switching from the second application to the first application. However, according to another embodiment, the indication is not necessary to be displayed.

At step 130, after the temporary operations of the different application are completed, the terminal determines whether a preset condition for switching applications is met. The preset condition for switching application may be referred to as a preset program switching condition. If it is determined that the preset condition for switching applications is not met, the terminal keeps running the second application in the foreground and displaying the same. If it is determined that the preset condition is met, the terminal switches from the second application to the resident application (e.g., first application). According to an embodiment of the present invention, the preset condition for switching applications may be a time passage or a particular operation in the terminal. The particular operation may include, but not limited to, touching a button or an particular area on the terminal, swinging the terminal, clicking a button (e.g. a volume key) in the terminal, gesture recognition, face recognition, voice recognition or any other human-computer interactions to be developed in the future. Such operation may be performed through any input interface or any sensor in the terminal such as a touch screen, a camera, a gyro sensor, an acceleration sensor, and a motion sensor. According to an embodiment, the terminal may determine whether the preset condition for switching applications is met and perform switching according to the determination.

For example, in the case when the video playing program is set as the resident program, if the terminal suddenly receives a text message while running the video playing program in the foreground, the terminal switches to a text message application to view the text message or reply to the same. After the text message is replied to, the terminal determines that the preset condition for switching applications is met according to receiving an input of the volume-adjusting button of the terminal.

At step 140, the resident program is switched to run in the foreground according to the determination.

In the embodiment, the resident program set at step 110 may be directly switched to run in the foreground of the terminal according to the determination at step 130. When only one resident program is set at step 110, the resident program may be directly switched to run in the foreground. In addition, when a plurality of resident programs are set at step 110, one of these resident programs may be switched to run in the foreground according to a preset switching rule or the user's designation.

The method for switching applications according to the above embodiment can switch applications directly by generating the program switching instruction. Moreover, it improve capacities of rapidly switching applications of the terminal by setting at least one application as the resident program, generating the program switching instruction according to the preset program switching condition where the second program different from the resident program runs in the foreground; and then switching the resident program to run in the foreground according to the generated program switching instruction.

In an alternative implementation of the embodiment, the step of setting at least one application as the resident program further comprises setting an application as the resident application, where a time length during which the application continuously runs in the foreground is longer than or equals to a preset resident duration threshold. In the implementation, an application continually runs in the foreground of the terminal for no smaller than the preset resident duration threshold means that the application has run for long time in the foreground. Therefore, it is determined that the application is required to run in the foreground for long time by the user, and thus the application may be regarded as the resident program. Then, the application may be set directly as the resident program. The implementation sets the resident program automatically based on the time length during which the application continuously runs in the foreground, and thus the efficiency of setting the resident program is improved.

Figure 2A:
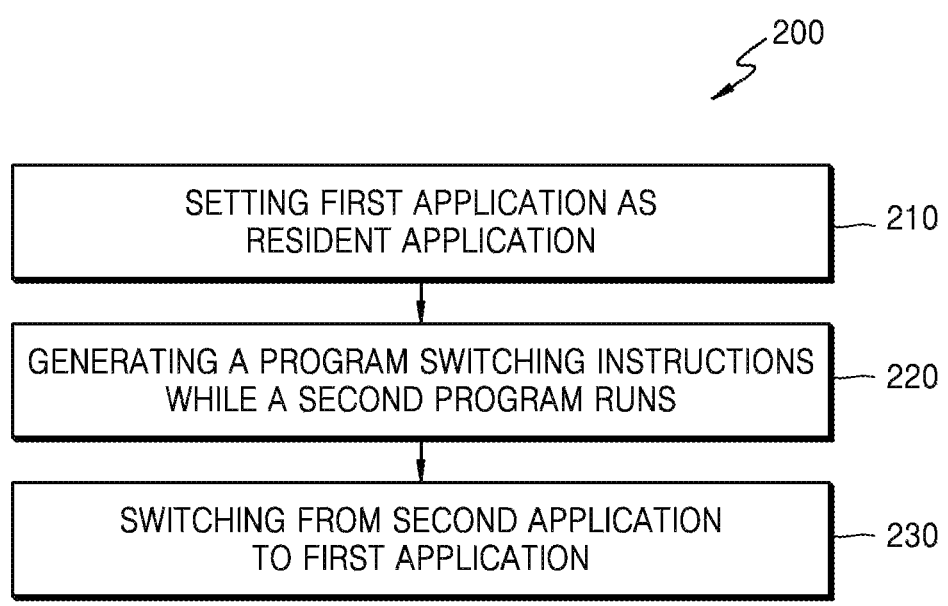
FIGS. 2A and 2B are flowcharts illustrating methods for switching applications according to another embodiments of the present application.

Reference is made to FIG. 2A, in which another embodiment of the present application is described.

At step 210, at least one application, for example a first application, is set as a resident application. Step 210 of FIG. 2A corresponds to Step 110 of FIG. 1.

At step 220, while a different application, for example a second application, runs in the foreground of the terminal, the terminal may generate a program switching instruction according to a preset condition for switching application. The preset condition for switching application of Step 220 may correspond to the preset condition for switching application of Step of Step 130 in FIG. 1.

At step 230, the resident application is switched to urn in the foreground according to the generated program switching instruction.

Figure 2B:
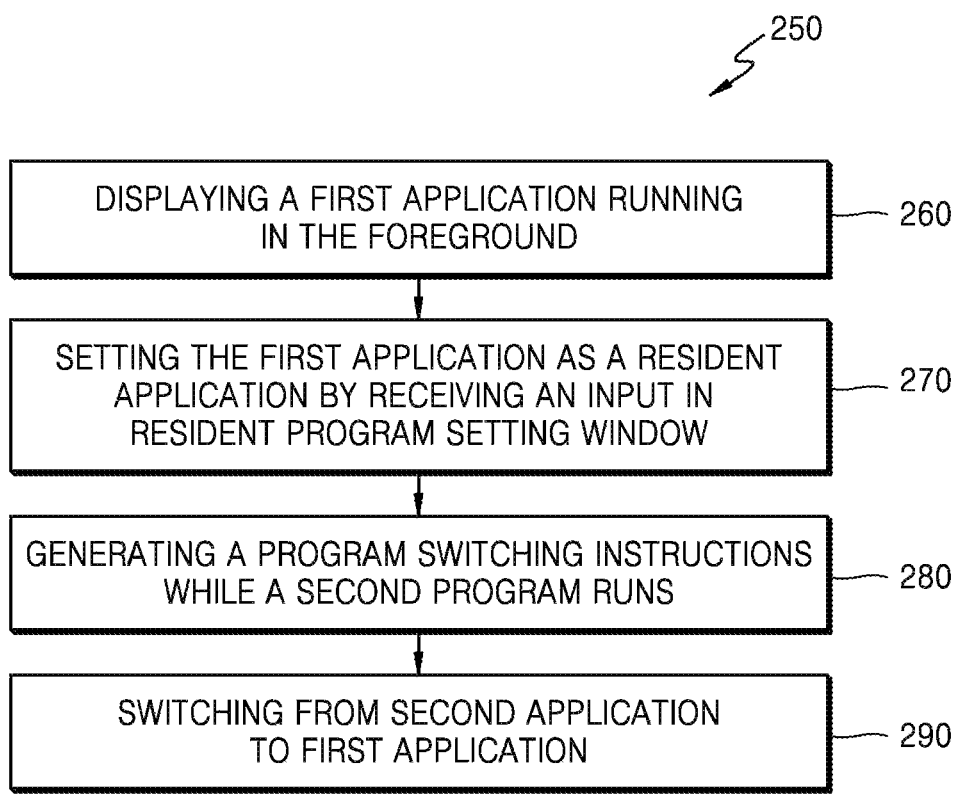

Reference is further made to FIG. 2B, in which still another embodiment of the present application is described.

At step 260, a resident program setting window is displayed in the screen interface for running the current application (first application).

In the embodiment, when an application runs in the foreground of the above terminal, if the user wants to set the application as the resident program, a resident program setting window may be displayed first in the screen interface for running the application. Herein, the resident program setting window may be an operation area created in the screen interface of the terminal, wherein the position of the operation area may be set in the screen as desired. The operation area may suspend and display above the interface of the current application. The current application may keep running in the foreground while the resident program setting window or the operation area is displayed. The resident application setting window may be displayed in one of various figures or shapes. For example, the resident application may be displayed in a square, a rectangle, or a circle.

In an alternative implementation of the embodiment, the step of displaying a resident program setting window in the screen interface for running the current application further comprises: displaying the resident program setting window in the screen interface for running the current application, where a time length during which the current application continuously runs is longer than or equals to a preset setting duration threshold. In the implementation, an application continually runs in the foreground of the terminal no smaller than the preset resident duration threshold means that the application has run for long time in the foreground. Therefore, it is determined that the application is needed to run in the foreground for long time by the user, and thus the application may be the resident program. Then, a resident program setting window may be set directly in the screen interface of the terminal, and the user can determine that whether the resident program setting instruction is generated in the resident program setting window according to requirements to set the current application as the resident program. In the implementation, the resident program setting window is automatically displayed based on the time length during which the application continuously runs in the foreground to facilitate subsequent setting operations of user.

At step 270, the current application is set as the resident program, where the resident program setting instruction is received in the resident program setting window.

In the embodiment, the operation area displayed at step 260, i.e., the resident program setting window may receive the resident program setting instruction sent by the user, and then the application currently running in the foreground of the terminal is set as the resident program according to the resident program setting instruction. The resident program setting instruction sent by the user may be generated by touching trace of fingers in the resident program setting window, or generated by clicking operation in the resident program setting window, or generated by other person-machine interactive operations in the resident program setting window. The present application is not limited to this.

At step 280, where a second program different from the resident program runs in a foreground, a program switching instruction is generated according to a preset program switching condition.

In the embodiment, after at least one resident programs is set at step 270, where the second program different from the resident program runs in the foreground, that is, when other program (i.e., the second program) except for the resident program runs in the foreground, the second program just runs in the foreground temporarily since the resident program is needed to run in the foreground for long time. Therefore, after the temporary operations for the second program are completed, the program switching instruction may be generated according to the preset program switching condition.

At step 290, the resident program is switched to run in the foreground according to the program switching instruction.

In the embodiment, the resident program set at step 270 may be directly switched to run in the foreground of the terminal according to the program switching instructions generated at step 270. When only one resident program is set at step 270, the resident program may be directly switched to run in the foreground. In addition, when a plurality of resident programs are set at step 270, one of these resident programs may be switched to run in the foreground according to a preset switching rule or the user's designation.

Figure 3:
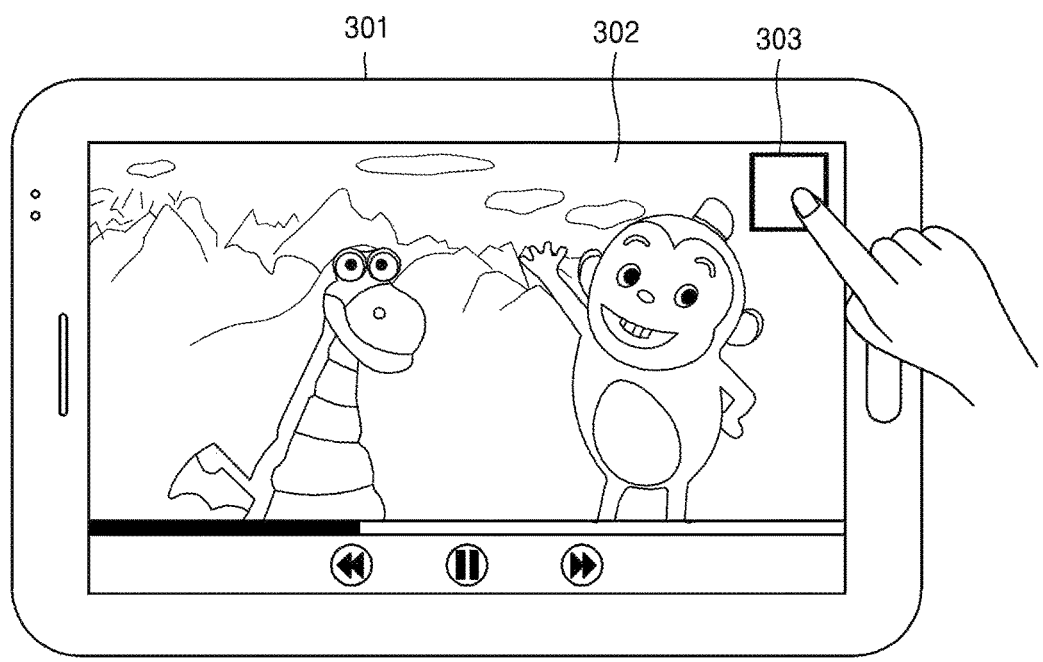
FIG. 3 is a schematic diagram illustrating an application scenario of the embodiment illustrated in FIG. 2.

FIG. 3 illustrates an application scenario of the embodiment. As shown in FIG. 3, a terminal 301 is a smart phone with a touch screen, and a video playing application 302 is running on the smart phone to play an animation. When the playing time of the animation is longer than or equals to the preset setting duration (such as, 5 minutes), a resident program setting window 303 may display in the screen interface of the phone. In order to set the video playing application as the resident program, the user may click the resident program setting window 303 by using a finger, that is, the click operation of the user is considered as the resident program setting instruction, and the video playing application 302 is set as the resident program. When application other than the video playing application 302 runs in the foreground of the terminal 301, a program switching instruction may be generated by the preset program switching condition, and then the video playing application 302 is switched to run in the foreground according to the generated program switching instruction.

As can be seen in FIG. 2B, the embodiment is different from that shown in FIG. 2A in that the resident program may be set by displaying the resident program setting window to receive the resident program setting instruction and the resident program setting is performed only when the setting instruction is received, and thus accuracy of the resident program setting can be further improved.

Figure 4:
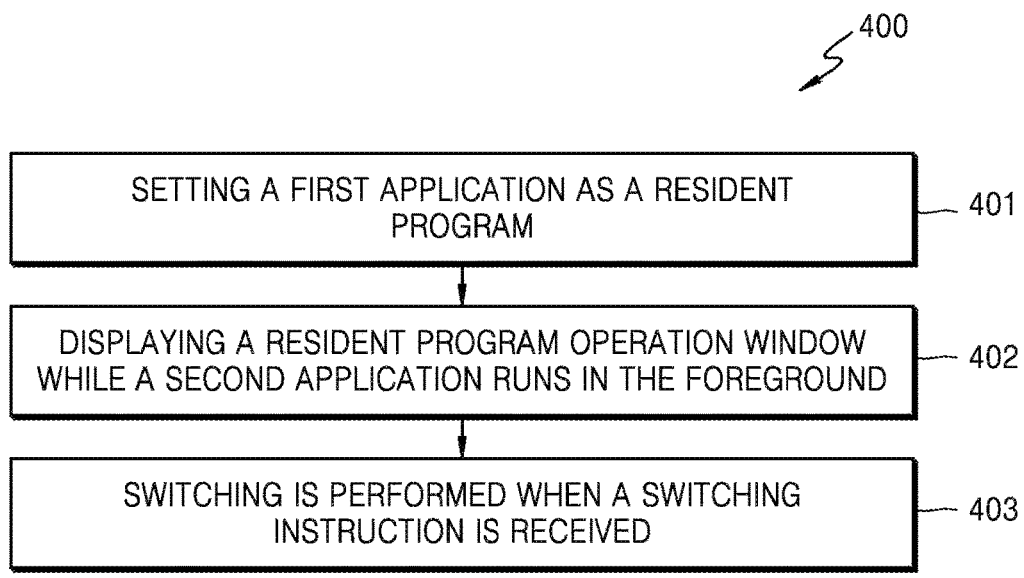
FIG. 4 is a flowchart illustrating a method for switching applications according to another embodiment of the present application.

FIG. 4 illustrates a method 400 for switching applications according to another embodiment. The method 400 may comprise the following steps.

At step 401, at least one application, for example a first application, is set as a resident program.

In the embodiment, the resident program refers to an application which is required to run in the foreground of the terminal for long time. During setting at least one application as the resident program, a specific application may be set as the resident program according to actual requirements of the user.

At step 402, a resident program operation window is displayed in the screen interface for running a second program where the second program different from the resident program runs in the foreground.

In the embodiment, after at least one resident program is set at the step 401, where the second program different from the resident program runs in the foreground, the resident program operation window may be displayed in the screen interface for running the second program. Herein, the resident program operation window may be an operation area created in the screen interface of the terminal, wherein the position where the operation area is displayed in the screen may be set as desired.

In an alternative implementation of the embodiment, the method for switching applications may further comprise displaying the resident program operation window in the screen interface for running the resident program, where at least one application is set as the resident application. After at least one resident program is set at the step 401, where the resident program runs in the foreground of the terminal, the resident program operation window described at step 402 may also be displayed in the screen interface for running the resident program, so that operations associated with the resident program may be performed in the resident program operation window where the resident program runs.

At step 403, the resident program is switched to run in the foreground where a program switching instruction is received in the resident program operation window.

In the embodiment, the operation area displayed at step 402, i.e., the resident program operation window may receive the program switching instruction sent by the user, and then the resident program that is set at step 401 may be switched to run in the foreground of the terminal according to the program switching instruction. The program switching instruction sent by the user may be generated by touching traces of fingers in the resident program operation window, or generated by clicking operations in the resident program switching window, or generated by other person-machine interactive operations in the resident program switching window. The present application is not limited to this.

In an alternative implement of the embodiment, the method for switching applications may further comprise setting the second program as the resident program and releasing the previous resident program, where a resident program substituting instruction is received in the resident program operation window. In the embodiment, the operation area displayed at step 402, i.e., the resident program operation window may receive the resident program substituting instruction sent by the user and then the second program is set as the resident program according to the resident program substituting instruction, and then the resident program performed at step 401 may be released. Then, the resident program is substituted so that the user can replace the set resident program at any time according to actual requirements.

In an alternative implementation of the embodiment, the method for switching applications may further comprise releasing resident program setting where a resident program releasing instruction is received in the resident program operation window. In the implementation, the operation area displayed at step 402, i.e., the resident program operation window may receive the resident program releasing instruction sent by the user and then the resident program setting performed at step 401 may be released according to the resident program releasing instruction. Then, the resident program can be released so that the user can determine whether the operations associated with the resident program is used according to actual requirements.

In an alternative implementation of the embodiment, the method for switching applications may further comprise adding the second program as a resident program, where the resident program adding instruction is received in the resident program operation window. In the implementation, the operation area displayed at step 402, i.e., the resident program operation window may receive the resident program adding instruction sent by the user and then according to the resident program setting performed at step 401, other applications may be added as the resident program according to the resident program adding instruction. Then, after the user sets the resident program, other applications can be added at any time to improve flexibly set the resident program.

It should be noted that in the above three implementations, the resident program operating instructions sent by the user comprise the resident program substituting instruction, the resident program releasing instruction and the resident program adding instruction. Similar to the program switching instruction in the step 403, the resident program operating instruction may be generated by touching traces of fingers in the resident program operation window, or generated by clicking operation in the resident program operation window, or generated by other person-machine interactive operations in the resident program operation window. In specific operation processes, a corresponding relationship table of different operation actions and operation instructions may be firstly created. When different operation actions are received in the resident program operation window, operation instructions may be acquired according to the corresponding relationship table. For creating the corresponding relationship table, operation actions may be further classified according to the currently running application. As an example of the click operation, operation instructions corresponding to the different click operations where different applications run are shown in table 1. When the second program runs in the foreground of the terminal, if click operation is received in the resident program operation window, it is determined that the program switching instruction is received in the resident program operation window according to table 1. Then the resident program may be switched to run in the foreground according to the program switching instruction.

TABLE 1

| Currently Running Application | Operation Action | Operation Instructions |
|---|---|---|
| The second program | click | Program switching instruction |
| | Double-click | Resident program substituting instruction |
| | press | Resident program adding instruction |
| The resident program | press | Resident program releasing instruction |

It will be appreciated by those skilled in the art, table 1 is a specific example of the embodiment and the protection scope of the present application is not limited to the corresponding relationship of the specific operation actions and the operation instructions. Any other corresponding relationships are applicable so long as different operation instructions can be generated in the resident program operation window. For example, a pull-down menu may be set for the resident program operation window. When the pull-down menu is activated to display, specific options in the menu may be selected to generate different resident program operating instructions.

In an alternative implementation of the embodiment, the method for switching applications of the embodiment further comprises displaying a plurality of the resident program operation windows corresponding to the plurality of resident applications in the screen interfaces for running the resident programs and the second program, wherein the resident program operation windows are similar to that displayed at step 402, i.e., functions of switching, substituting, releasing and adding of the resident program may be implemented. However, the plurality of the resident program operation windows corresponds to the plurality of resident applications. When the program switching instruction is received in one resident program operation window, the resident programs corresponding to the windows may be switched to run in the foreground.

In an alternative implementation for the method according to the embodiment, an icon or a shortcut of the resident program is displayed in the resident program operation window. An identification of the resident program may be displayed in the resident program operation window to remind the user of which resident program the user can control in the resident program operation window. In order to display the identification of the resident program, only icon of the resident program may be displayed. The shortcut of the resident program may also be directly displayed and may be displayed as an icon with an arrow. When the shortcut of the resident program is displayed in the resident program operation window, the resident program can be quickly initiated by clicking the shortcut directly to further simplify the method for switching the resident program to run in the foreground in the embodiment.

In an alternative implementation for the method according to the embodiment, the resident program operation window is a form of suspended window which may be suspended above other pictures (such as the interface for running the application) displayed in the terminal and is not affected by other active interfaces. That is, the suspended window is an independent operating area and does not belong to any active interface.

Figure 5:
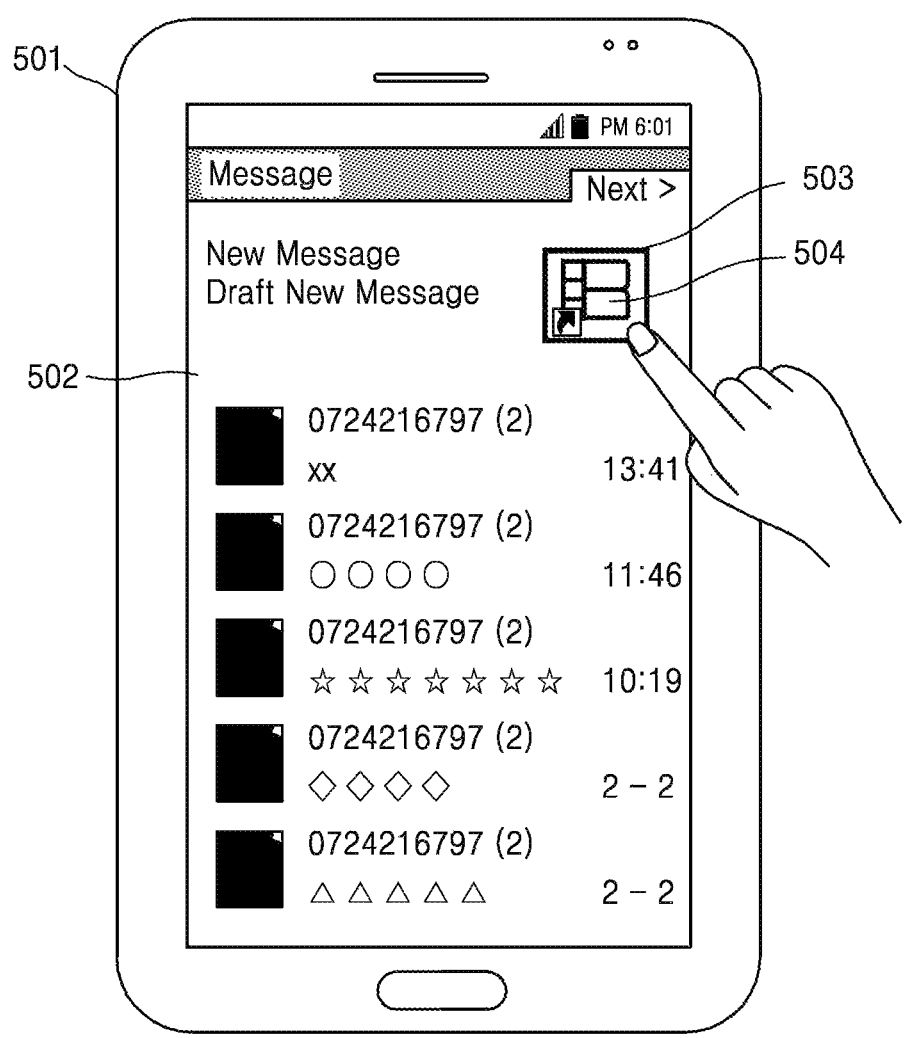
FIG. 5 is a schematic diagram illustrating an application scenario of the embodiment illustrated in FIG. 4.

FIG. 5 illustrates an application scenario of the embodiment. As shown in FIG. 5, a terminal 501 is a smart phone with a touch screen and a video playing program has been set as the resident program. During watching the video, a text message is received by the terminal and thus a text message interface 502 is shown to read corresponding text messages. A resident program operation window 503 corresponding to the video playing program is displayed in the text message interface and a shortcut 504 of the video playing program is displayed in the resident program operation window 503. After handling with the received text message, the user may click directly the shortcut 504 in the resident program operation window 503 and the shortcut 504 may initiate the video playing program, that is, switch the video playing program to run in the foreground of the terminal 501.

As can be seen in FIG. 4 the process 400 of the method for switching applications in this embodiment displays the resident program operation window in the screen interface for running the second program and then switches the resident program to run in the foreground according to the program switching instruction received in the resident program operation window. Therefore, the program switching may be performed by using the resident program operation window so that the user can flexibly select program switching opportunity according to actual conditions, to expand range of application of the program switching method.

Figure 6:
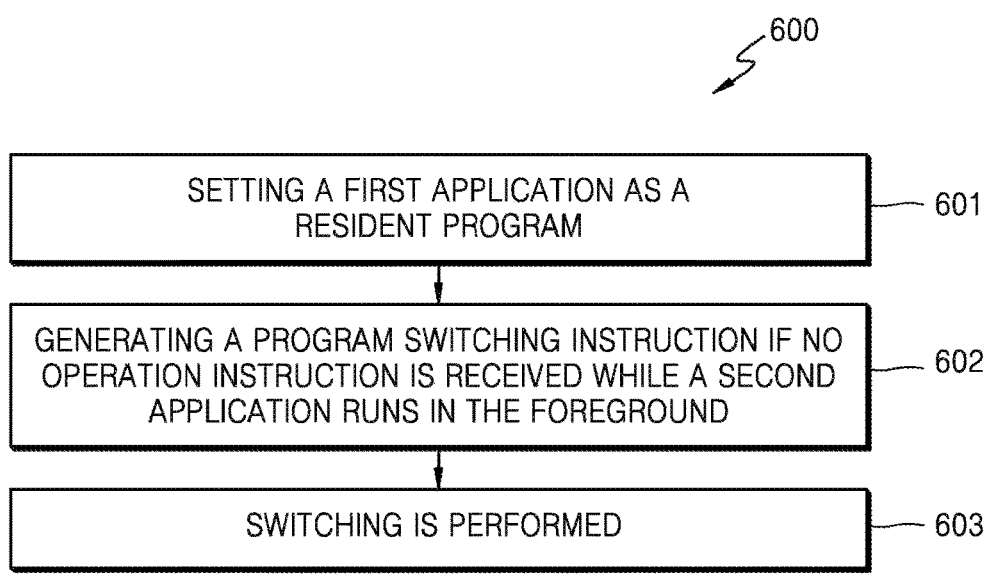
FIG. 6 is a flowchart illustrating a method for switching applications according to yet a further embodiment of the present application.

Reference is made to FIG. 6, in which a flow 600 of a method for switching applications according to another embodiment is illustrated. The flow 600 of the method for switching applications may comprise the following steps.

At step 601, at least one application, for example a first application, is set as a resident program.

In the embodiment, the resident program refers to an application which is required to run in the foreground of the terminal for long time. During setting at least one application as the resident program, a specific application may be set as the resident program according to actual requirements of a user.

At step 602, where a second program different from the resident program runs in the foreground, if no operating instruction is received by the second program in a preset switching duration, a program switching instruction will be generated.

In the embodiment, where other program, i.e., the second program, different from the resident program runs in the foreground, since the resident program is needed to run in the foreground for long time, the second program is required to run for a short time in the foreground. If no operating instruction is received by the second program in the preset switching duration, it is determined that operations of the second program by the user has finished and no more operation is required, and thus the program switching instruction is generated and thus the resident program returns to run in the foreground accordingly.

At step 603, the resident program is switched to run in the foreground according to the program switching instruction.

In the embodiment, the resident program that is set at step 601 may be directly switched to run in the foreground of the terminal according to the program generated at step 602. When only one resident program is set at step 601, the resident program may be directly switched to run in the foreground. In addition, when a plurality of resident programs are set at step 601, one of these resident programs may be switched to run in the foreground according to a preset switching rule or the user's designation.

As can be seen in FIG. 6, different from the embodiment as shown in FIG. 1, the method 600 for switching applications in this embodiment switches the resident program to run in the foreground by generating the program switching instruction if no operating instruction is received by the second program in the preset switching duration. Therefore, the embodiment may perform, by recording operating states of the second program, the program switching to return to the resident program where the second program does not operate in the preset switching duration so that unnecessary program resource consumption can be avoided.

Figure 7:
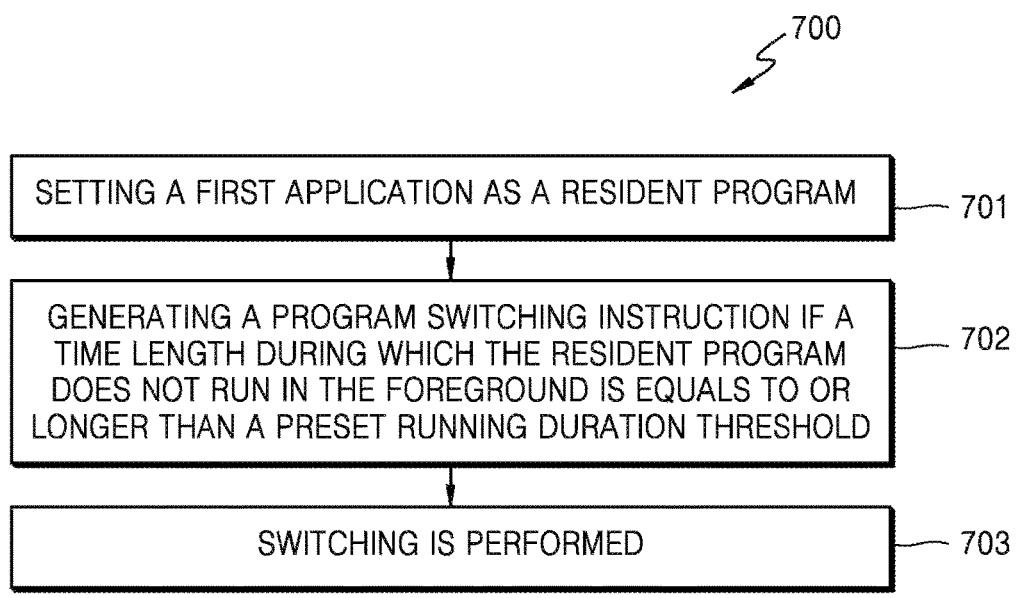
FIG. 7 is a flowchart illustrating a method for switching applications according to a further embodiment of the present application.

With reference to FIG. 7, a method 700 for switching applications according to another embodiment is illustrated. The method 700 for switching applications may comprise the following steps.

At step 701, at least one application, for example a first application, is set as a resident program.

In the embodiment, the resident program refers to an application which is required to run in the foreground of the terminal for long time. During setting at least one application as the resident program, a specific application may be set as the resident program according to actual requirements of a user.

At step 702, if a time length during which the resident program does not continuously run in the foreground is longer than or equals to a preset running duration threshold, a program switching instruction is generated.

In the embodiment, where the second program different from the resident program runs in the foreground, since only one application can run in the foreground of the terminal each time, the resident program cannot run in the foreground. Where the time length during which the resident program does not continuously run in the foreground is longer than or equals to the preset running duration threshold, it is determined that operations for the second program has finished and the program switching instruction is generated and thus the resident program returns to run in the foreground accordingly.

At step 703, the resident program is switched to run in the foreground according to the program switching instruction.

In the embodiment, the resident program that is set at step 701 may be directly switched to run in the foreground of the terminal according to the program generated at step 702. When only one resident program is set at step 701, the resident program may be directly switched to run in the foreground. In addition, when a plurality of resident programs are set at step 701, one of these resident programs may be switched to run in the foreground according to a preset switching rule or the user's designation.

In an alternative implementation of the embodiment, before the step of switching the resident program to run in the foreground, the method further comprises: displaying prompt information in the screen interface for running the second program, wherein the prompt information is used to remind the user of the fact that the resident program will be switched to run in the foreground. In the implementation, since the program switching instruction is generated according to a time condition, the user cannot know exactly when the resident program is switched to run in the foreground. To remind the user that the resident program will be switched to run in the foreground, the prompt information may also be displayed in the screen interface for running the second program, wherein the prompt information may be one of text information, picture information and dynamic image information.

In an alternative implementation of the embodiment, the prompt information comprises remaining time before the resident program is switched to run in the foreground. In the implementation, since the prompt information is used to remind the user that the resident program will be switched to run in the foreground, the remaining time before the resident program is switched to run in the foreground may be displayed in count-down way, so that the user knows clearly the remaining time of switching programs.

In an alternative implementation of the embodiment, the method further comprising: providing a delay interface in the screen interface for running the second program and extending the remaining time, where a delay switching instruction is received by the delay interface. In the implementation, since the program switching instruction is generated according to a time condition, the delay interface may be provided in the screen interface for running the second program. The delay interface may be displayed in the screen interface for running the second program as an operation window, wherein the remaining time may be extended where the delay switching instruction is received in the operation window. The delay switching instruction may be a delay switching instruction generated by touching trace of fingers in the above operation window, or generated by clicking operations in the above operation window, or generated by other possible person-machine interactive operations in the above operation window. Therefore, if the operations for the second program have been finished, the user may extend the remaining time of the switching program by the delay switching interface so that unnecessary compulsory program switching can be avoided.

In an alternative implementation of the embodiment, where a plurality of applications are set as resident programs, the method further comprises: setting priority of the plurality of resident programs. In the implementation, if the plurality of applications are set as the resident programs at step 601 or step 701, priority of the plurality of resident programs may be set first. Where setting the priority, the priority may be determined according to the user autonomously or based on the situations of the resident programs. For example, the priority of a resident program which is most frequently used recently for a period of time may be set to be the highest. After the priorities of the plurality of resident program have been set, the step 603 or 703 of switching the resident programs to run in the foreground further comprises switching a resident program with the highest priority to run in the foreground to ensure the resident program with the highest use frequency has been switched to run in the foreground.

As can be seen in FIG. 7, the method 700 for switching applications in the embodiment differs from the embodiment shown in FIG. 1 in that, the program switching instruction will be generated and the resident program is switched to run in the foreground accordingly if the non-running duration of the resident program is longer than or equals to the preset running duration. Therefore, the embodiment may perform program switching by recording operating states of the second program, and the resident program will be directly return to the foreground where the resident program does not operate in the preset operating duration so that efficiency of the program switching can be further improved.

Figure 8:
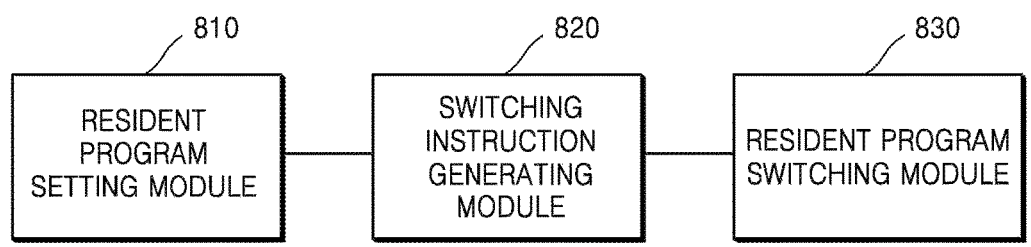
FIG. 8 is a schematic structural diagram illustrating an apparatus for switching applications according to an embodiment of the present application.

With reference to FIG. 8, a schematic structural diagram illustrating an apparatus for switching applications according to an embodiment of the present application is shown. As shown, the apparatus for switching applications according to the embodiment comprising a resident program setting module 810, a switching instruction generating module 820 and a resident program switching module 830.

The resident program setting module 810 is configured to set at least one application as a resident program.

The switching instruction generating module 820 is configured to generate a program switching instruction according to a preset program switching condition, where a second program different from the resident program set by the resident program setting module 810 runs in a foreground.

The resident program switching module 830 is configured to switch the resident program to run in the foreground, according to the program switching instruction generated by the switching instruction generating module 820.

In the apparatus according to the above embodiment of the present application, at least one application is set as the resident program by the resident program setting module. The program switching instruction may be generated by the switching instruction generating module according to the preset program switching condition, where the second program different from the resident program runs in the foreground; and then the resident program is switched by the resident program switching module to run in the foreground, according to the program switching instruction. The above apparatus can switch the applications directly by generating the program switching instruction, so that the capacity of rapidly switching applications of the terminal can be improved.

In an alternative implementation of the embodiment, the resident program setting module 810 comprises: a resident duration setting unit (not shown) for setting an application as the resident program, where a time length during which the application continuously runs in the foreground is longer than or equals to a preset resident duration threshold.

Figure 9:
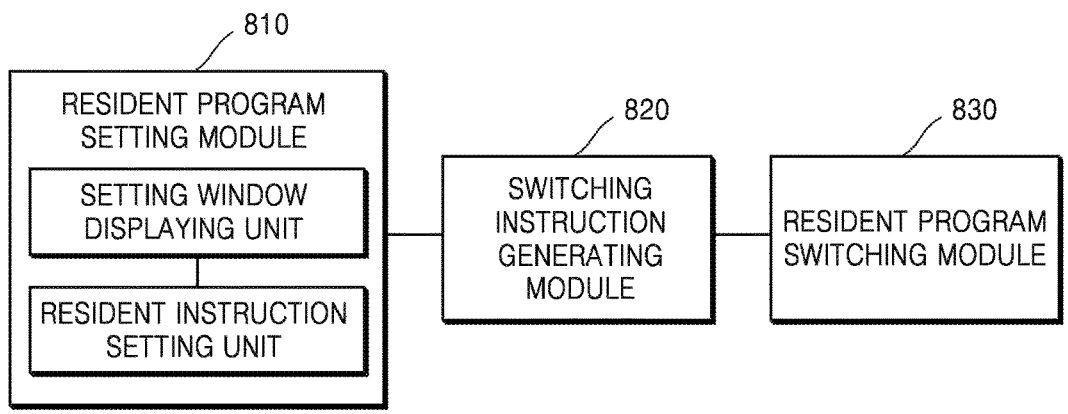
FIG. 9 is a schematic structural diagram illustrating an apparatus for switching applications according to another embodiment of the present application.

In an alternative implementation of the embodiment, as shown in FIG. 9, the resident program setting module 810 comprises: a setting window displaying unit 811 and a resident instruction setting unit 812.

The setting window displaying unit 811 is configured to display a resident program setting window in the screen interface for running the current application.

The resident instruction setting unit 812 is configured to set an application as the resident program, where a resident program setting instruction is received in the resident program setting window displayed by the setting window displaying unit 811.

In an alternative implementation of the embodiment, the setting window displaying unit 811 comprises: a setting window displaying subunit (not shown) for displaying a resident program setting window in the screen interface for running the current application, where a time length during which the current application continuously runs is longer than or equals to a preset setting duration threshold.

As can be seen in FIG. 9, different from the embodiment shown in FIG. 8, the setting window displaying unit in the embodiment displays the resident program setting window and the resident instruction setting unit sets the current application as the resident program, where a resident program setting instruction is received in the resident program setting window displayed by the setting window displaying unit, so that accuracy of the resident program setting can be further improved.

Figure 10:
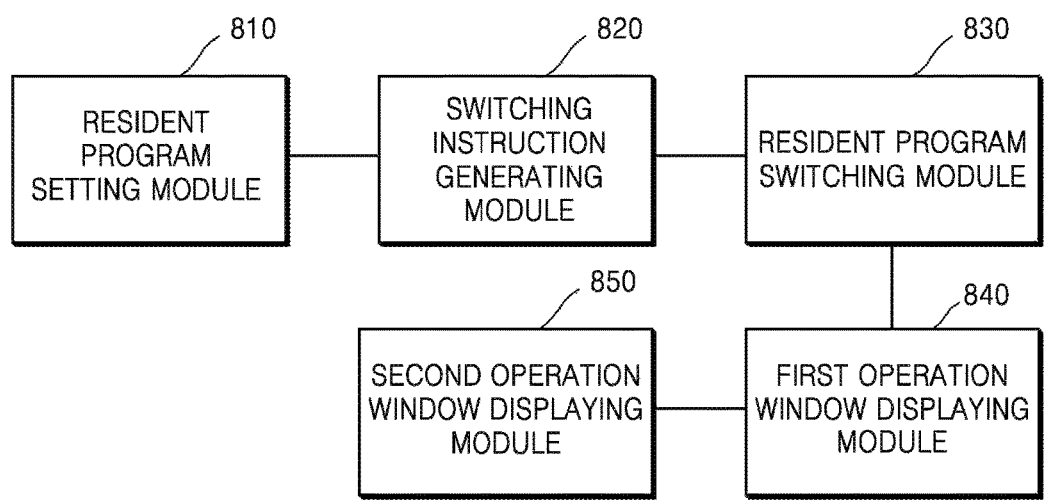
FIG. 10 is a schematic structural diagram illustrating an apparatus for switching applications according to a further embodiment of the present application.

In an alternative implementation of the embodiment, as shown in FIG. 10, the apparatus for switching applications further comprises: a first operation window displaying module 840 for displaying a resident program operation window in the screen interface for running the second program.

In an alternative implementation of the embodiment, the apparatus for switching applications further comprises: a second operation window displaying module 850 for displaying the resident program operation window in the screen interface for running the resident program, where at least one application is set as the resident application.

In an alternative implementation of the embodiment, the apparatus for switching applications further comprises the following modules.

An operation window switching module (not shown) is configured to switch the resident program to run in the foreground where a program switching instruction is received in the resident program operation window.

An operation window substituting module (not shown) is configured to set the second program as the resident program and releasing the previous resident program setting, where a resident program substituting instruction is received in the resident program operation window.

An operation window releasing module (not shown) is configured to release the resident program, where a resident program releasing instruction is received in the resident program operation window.

An operation window adding module (not shown) is configured to add the second program as the resident program, where a resident program adding instruction is received in the resident program operation window.

In an alternative implementation of the embodiment, where a plurality of applications are set as the resident programs, the apparatus for switching applications further comprises: a multi-window displaying module (not shown) for displaying a plurality of the resident program operation windows corresponding to the plurality of applications in the screen interfaces for running the resident programs and the second program.

In an alternative implementation of the embodiment, an icon or a shortcut of the resident program is displayed in the resident program operation window.

In an alternative implementation of the embodiment, the resident program operation window is a form of suspended window.

As can be seen in FIG. 10, different from the embodiment shown in FIG. 8, the first operation window displaying module in the embodiment displays the resident program operation window in the screen interface in which the second program runs and then switches the resident program to rung in the foreground according to the program switching instruction received in the resident program operation window. Therefore, in the embodiment, applications can be switched by using the resident program operation window so that the user can flexibly select program switching opportunity according to actual conditions to expand range of application of the program switching method.

Figure 11:
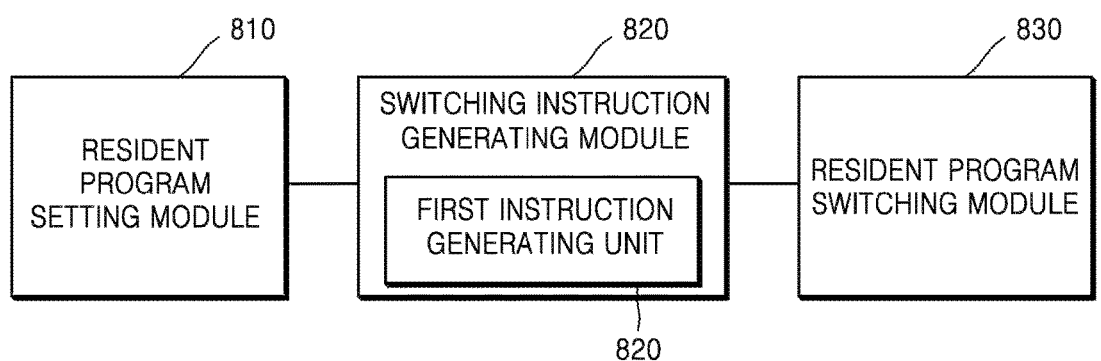
FIG. 11 is a schematic structural diagram illustrating an apparatus for switching applications according to a further embodiment of the present application.

In an alternative implementation of the embodiment, as shown in FIG. 11, the switching instruction generating module 820 comprises: a first instruction generating unit 821 for generating the program switching instruction, where no operating instruction is received by the second program in a preset switching duration.

As can be seen in FIG. 11, different from the embodiment shown in FIG. 8, the first instruction generating unit in the embodiment generates the program switching instruction, where no operating instruction is received by the second program in a preset switching duration. Therefore, the embodiment may perform program switching by recording operating states of the second program such that the second program returns to the resident program, where the second program does not operate in the preset switching duration. Accordingly, the unnecessary program resource consumption can be avoided.

Figure 12:
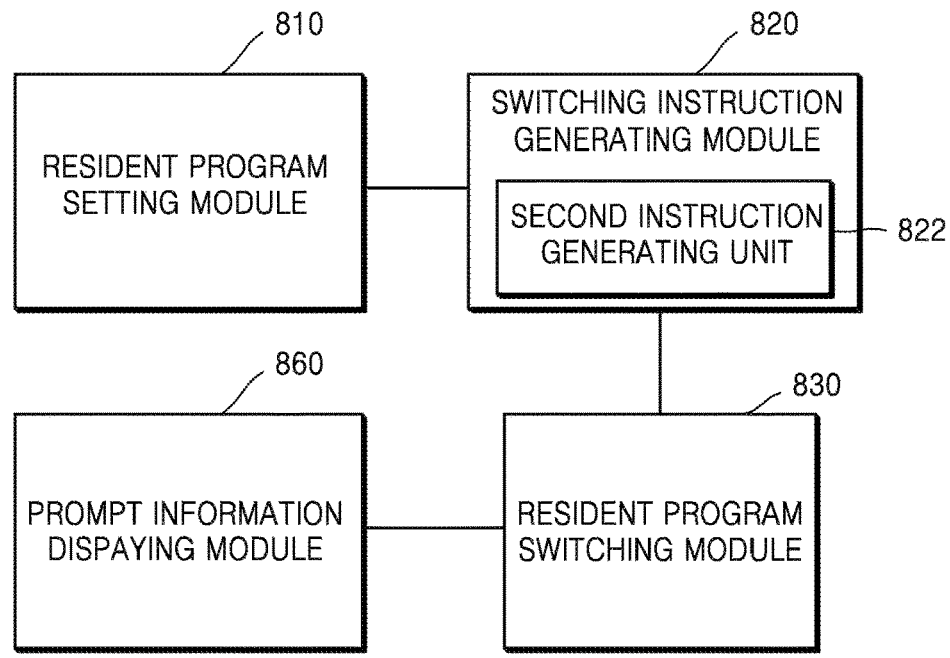
FIG. 12 is a schematic structural diagram illustrating an apparatus for switching applications according to a further embodiment of the present application.

In an alternative implementation of the embodiment, as shown in FIG. 12, the switching instruction generating module 820 comprises: a second instruction generating unit 822 for generating the program switching instruction, where a time length during which the resident program does not continuously run in the foreground is longer than or equals to a preset running duration threshold.

In an alternative implementation of the embodiment, as shown in FIG. 12, the apparatus for switching applications further comprises: a prompt information displaying module 860 for displaying prompt information in the screen interface for running the second program, wherein the prompt information is used to remind the user that the resident program will be switched to run in the foreground.

In an alternative implementation of the embodiment, the prompt information comprises remaining time before the resident program is switched to run in the foreground.

In an alternative implementation of the embodiment, the apparatus for switching applications further comprises: a delay providing module (not shown) is configured to provide a delay interface in the screen interface for running the second program; and a delay switching module (not shown) is configured to extend the remaining time where a delay switching instruction is received by the delay interface.

As can be seen in FIG. 12, different from the embodiment shown in FIG. 8, the second instruction generating unit in the embodiment generates the program switching instruction, where the non-running duration of the resident program is longer than or equals to a preset running duration. Therefore, in the embodiment, by recording operating states of the second program, the program switching is performed so that the second program returns to the resident program directly where the resident program does not operate in the preset operating duration. Accordingly, the efficiency of the program switching can be further improved.

Figure 13:
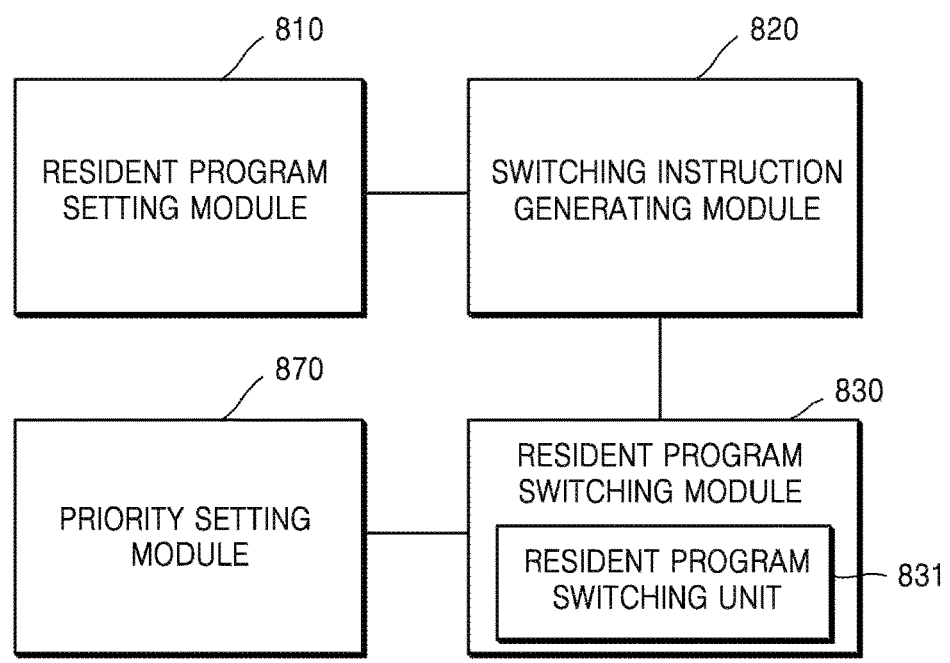
FIG. 13 is a schematic structural diagram illustrating an apparatus for switching applications according to a further embodiment of the present application.

In an alternative implementation of the embodiment, as shown in FIG. 13, where a plurality of applications are set as resident programs, the apparatus for switching applications further comprises: a priority setting module 870 for setting priority of the plurality of resident program.

The resident program switching module 830 comprises a resident program switching unit 831 for switching the resident program with the highest priority set by the priority setting module 870 to run in the foreground.

As can be seen in FIG. 13, different from the embodiment shown in FIG. 8, the priority setting module in the embodiment may set priority of the plurality of resident programs and then the resident program switching unit switches the resident program with the highest priority set by the priority setting module to run in the foreground, so as to ensure that the resident program with the most use frequency will be switched to run in the foreground.

Figure 14:
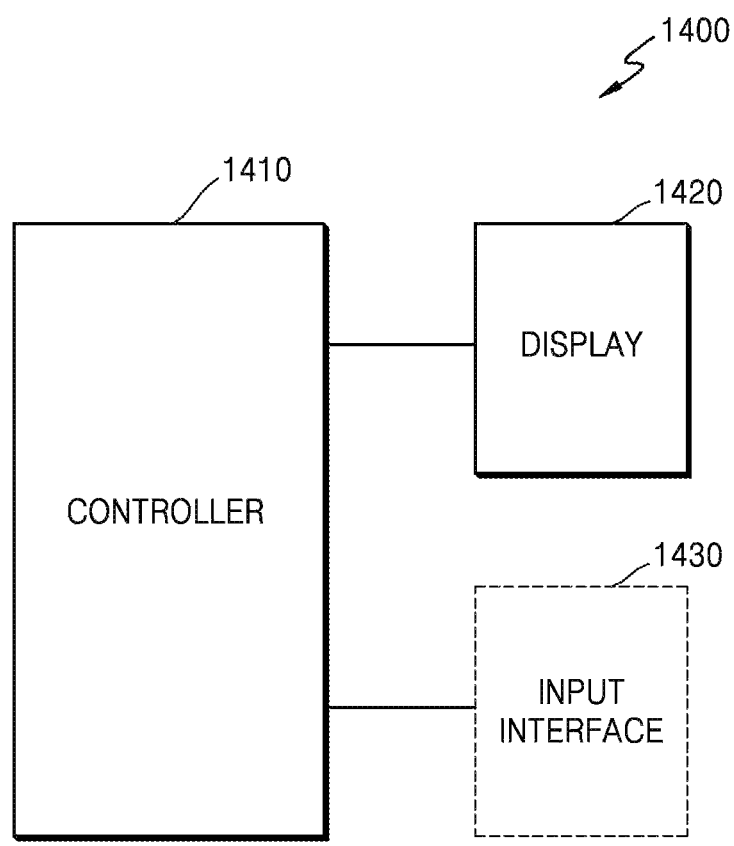
FIG. 14 is a schematic structure depicting an apparatus according to another embodiment of the present invention.

Reference is made to FIG. 14, wherein an embodiment of a terminal 1400 is depicted in a block diagram.

The terminal 1400 may comprise Controller 1410 and Display 1420. According to another embodiment, the terminal 1400 may further comprise Input Interface 1430. The terminal 1400 may be included in the terminal of FIG. 8 or the terminal 1400 may perform all functions of the terminal of FIG. 8.

Display 1420 displays applications running in the terminal 1400. Display 1420 may display a single application running in the foreground of the terminal 1400. According to an embodiment, Display 1420 may display two or more applications at a same time. The display 1420 may be any form of display screen, implemented as hardware. According to an embodiment, the display may include a touch screen. In such embodiment, Input Interface 1430 may be implemented in Display 1420.

Input Interface 1430 receives a user input. The user input may be clicking a button, implemented as hardware or software in the terminal 1400. According to an embodiment, the user input may be a touch input on a touch screen in Display 1420. The user input may be an input for setting a first application as a resident application. Or, the user input may be an input for switching from a second application running in the foreground of the terminal 1400 to the first application. Input interface 1430 may be implemented to receive any form of an input mentioned throughout the specification.

Controller 1410 controls components and functions of the terminal 1400. Controllers 1410 include, but is not limited to, a hardware-implemented CPU (central processing unit) or any hardware-implanted circuit. Controller 1410 controls to set a first application as a resident application. Controller 1410 may controls to switch from a second application running in the foreground of the terminal 1400 to the first application. Controller 1410 may generate instructions for program switching. Controller 1400 may control the terminal 1400 according to a user input or a predetermined instruction or conditions in the terminal.

The embodiments of the present application can be implemented by software or hardware. The modules described herein may be implemented in a processor. For example, a processor comprises a resident program setting module, a switching instruction generating module and a resident program switching module. Herein, the names of these modules in some embodiments do not intend to limit the modules themselves. For example, the resident program setting module may also be described as "a module for setting at least one applications as a resident program".

In addition, there is provided a computer readable storage media, which may be the computer readable storage media involved in the apparatus according to the embodiments of the present application, or a computer readable storage media individually exists and is not fitted into the terminal. There are one or more computer programs stored on the computer readable storage media, and the one or more computer programs embodied by one or more processors to perform the method for switching applications according to the present application.

The above description only refers to the preferred embodiments of the present application and is just used to explain the principles of applied techniques. It will be appreciated by those skilled in the art, the scope of the invention as claimed in the present application is not limited to the solutions consisting of particular combinations of features described above, and should cover other solutions formed by any combination of features from the foregoing or an equivalent thereof without departing from the inventive concepts. For example, a solution formed by replacing the above features with features having similar functions disclosed (but not limited to) in the present application is also applicable.

What is claimed is:

1. A method for switching applications in an apparatus, the method comprising:
   executing a first application in a foreground of the apparatus;
   automatically displaying a resident program setting window in an interface of the first application based on the first application continuously running in the foreground of the apparatus for a time period that is greater than or equal to a non-zero first threshold time period;
   setting the first application as a resident application based on a user input being received in the resident program setting window;
   executing a second application in the foreground and displaying a resident program operation window in an interface of the second application;
   switching a foreground application of the apparatus from the second application to the first application which is set to the resident application based on the shortcut icon displayed in the resident program operating window being activated;
   displaying prompt information, comprising a remaining time before the second application is switched to the resident application, and indicating that the second application running in the foreground will be switched to the resident application;
   providing a delay interface for extending the remaining time; and
   adjusting the remaining time based on a user input with respect to the delay interface.

2. The method according to claim 1, wherein the first application is set as the resident application while the first application runs in the foreground of the apparatus.

3. The method according to claim 1, wherein the automatically displaying further comprises:
   displaying the resident program setting window only when the time period during which the first application continuously runs in the foreground is greater than or equal to the non-zero first threshold time period.

4. The method of claim 1, wherein the switching is performed based on a switching user input received on the shortcut icon.

5. The method according to claim 1, wherein the switching is automatically performed when no operating instruction is received by the second application within a second threshold time period.

6. The method according to claim 1, wherein the switching is automatically performed when another time period during which the resident application does not continuously run in the foreground is greater than or equal to a third threshold time period.

7. The method according to claim 1,
   wherein a plurality of applications including the first application are set as a plurality of resident applications including the resident application,
   wherein the method further comprises: setting priorities of the plurality of resident applications, and
   wherein the switching further comprises: switching the second application running in the foreground to one of the plurality of resident applications which has a highest priority among the set priorities.

8. The method according to claim 7, wherein the priorities of the plurality of resident applications are set based on a running frequency of the plurality of resident applications.

9. An apparatus, comprising:
   a display configured to display an interface of a first application and an interface of a second application; and
   at least one processor configured to:
      execute the first application in a foreground of the apparatus;
      control the display to automatically display a resident program setting window in the interface of the first application based on determining that the first application continuously running in the foreground of the apparatus for a time period that is greater than or equal to a non-zero first threshold time period;
      set the first application as a resident application based on a user input being received in the resident program setting window;
      execute the second application in the foreground and control the display to display a resident program operation window in the interface of the second application; and
      switch a foreground application of the apparatus from the second application to the first application which is set to the resident application based on the shortcut icon displayed in the resident program operating window being activated,
   display prompt information, comprising a remaining time before the second application is switched to the resident application, and indicating that the second application running in the foreground will be switched to the resident application;
   provide a delay interface for extending the remaining time; and
   adjust the remaining time based on a user input with respect to the delay interface.

10. The apparatus of claim 9, wherein the first application is set as the resident application while the first application runs in the foreground of the apparatus.

11. The apparatus of claim 9, wherein the at least one processor is configured to automatically switch the second application running in the foreground to the resident application when no operating instruction is received by the second application within a second threshold time period.

12. The apparatus of claim 9, wherein the at least one processor is configured to automatically switch the second application running in the foreground to the resident application when another time period during which the resident application does not continuously run in the foreground is greater than or equal to a third threshold time period.

13. The apparatus of claim 9, wherein the at least one processor is configured to display the resident program setting window only when the time period during which the first application continuously runs in the foreground is greater than or equal to the non-zero first threshold time period.

14. The apparatus of claim 9, wherein the at least one processor is configured to switch the foreground application based on a switching user input received on the shortcut icon.

15. The apparatus of claim 9, wherein a plurality of applications including the first application are set as a plurality of resident applications including the resident application,
   wherein the at least one processor is further configured to set priorities of the plurality of resident applications, and switch the second application running in the foreground to one of the plurality of resident applications which has a highest priority among the set priorities.

16. An apparatus, comprising:
a display configured to display a moving image reproduced by a video playing application; and
at least one processor configured to:
- control the display to automatically display a resident program setting window in the moving image based on determining that the video playing application continuously running in a foreground of the apparatus for a non-zero time period that is greater than or equal to a threshold time period;
- set the video playing application as a resident application based on a user input being received in the resident program setting window;
- execute a text message application in the foreground, as a non-resident application, and control the display to display a resident program operating window in a text message interface of the text message application;
- switch a foreground application of the apparatus from the text message application to the video playing application which is set to be the resident application, based on the shortcut icon displayed in the resident program operating window being activated,
- display prompt information, comprising a remaining time before the second application is switched to the resident application, and indicating that the second application running in the foreground will be switched to the resident application;
- provide a delay interface for extending the remaining time; and
- adjust the remaining time based on a user input with respect to the delay interface.

17. The apparatus of claim 16, wherein the video playing application is set as the resident application while the video playing application runs in the foreground of the apparatus.

18. The apparatus of claim 16, wherein the at least one processor is configured to automatically switch the text message application running in the foreground to the resident application when no operating instruction is received by the text message application within a second threshold time period.

19. The apparatus of claim 16, wherein the at least one processor is configured to display the resident program setting window only when the time period during which the video playing application continuously runs in the foreground is greater than or equal to the non-zero first threshold time period.

* * * * *